United States Patent
Taniguchi

(10) Patent No.: US 11,651,415 B2
(45) Date of Patent: May 16, 2023

(54) ON-DEMAND SERVICE PROVIDING SYSTEM AND ON-DEMAND SERVICE PROVIDING METHOD

(71) Applicant: YOKOGAWA ELECTRIC CORPORATION, Musashino (JP)

(72) Inventor: Koichi Taniguchi, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 206 days.

(21) Appl. No.: 16/462,023

(22) PCT Filed: Nov. 20, 2017

(86) PCT No.: PCT/JP2017/041670
§ 371 (c)(1),
(2) Date: May 17, 2019

(87) PCT Pub. No.: WO2018/101103
PCT Pub. Date: Jun. 7, 2018

(65) Prior Publication Data
US 2019/0333129 A1    Oct. 31, 2019

(30) Foreign Application Priority Data
Nov. 30, 2016    (JP) ............... JP2016-232929

(51) Int. Cl.
*G06Q 30/00* (2023.01)
*G06Q 30/0601* (2023.01)
(Continued)

(52) U.S. Cl.
CPC ....... *G06Q 30/0633* (2013.01); *G06Q 10/087* (2013.01); *G06F 3/14* (2013.01); *G06Q 20/12* (2013.01)

(58) Field of Classification Search
CPC .. G06Q 30/0633; G06Q 10/087; G06Q 20/12; G06F 3/14
(Continued)

(56) References Cited

U.S. PATENT DOCUMENTS

| | | | | |
|---|---|---|---|---|
| 6,219,628 | B1 * | 4/2001 | Kodosky | G06F 30/34 703/2 |
| 8,050,882 | B2 * | 11/2011 | Sierer | G06Q 20/10 702/123 |

(Continued)

FOREIGN PATENT DOCUMENTS

| | | |
|---|---|---|
| CA | 2853033 A1 | 4/2013 |
| JP | 2002-82718 A | 3/2002 |

(Continued)

OTHER PUBLICATIONS

Abhaya Asthana et al. "An Indoor Wireless System for Personalized Shopping Assistance", Mobile Computing System and Applications, 1994, pp. 69-74. (Year: 1994).*

*Primary Examiner* — Naeem U Haq
(74) *Attorney, Agent, or Firm* — Sughrue Mion, PLLC

(57) ABSTRACT

An on-demand service providing system which provides a service required for measuring a measurement target in response to a request from a user, the on-demand service providing system includes a selector configured to select a service which uses a sensor required for measuring at least the measurement target, and a system environment setter configured to set up a system environment for collecting a measurement result of the sensor used by the service selected by the selector as data which is usable for the user who has instructed to select the service via a network based on selection information obtained by the selector.

12 Claims, 6 Drawing Sheets

(51) Int. Cl.
    *G06Q 10/087*     (2023.01)
    *G06F 3/14*     (2006.01)
    *G06Q 20/12*     (2012.01)

(58) Field of Classification Search
    USPC ........................................................ 705/26.8
    See application file for complete search history.

(56) References Cited

U.S. PATENT DOCUMENTS

| | | |
|---|---|---|
| 2003/0036873 A1 | 2/2003 | Sierer et al. |
| 2004/0039550 A1* | 2/2004 | Myers ................. G06F 11/3414 |
| | | 702/186 |
| 2014/0172651 A1* | 6/2014 | Fiori .................... G06Q 10/087 |
| | | 705/28 |
| 2015/0051930 A1 | 2/2015 | Yamaguchi et al. |
| 2015/0052443 A1 | 2/2015 | Funase |
| 2015/0289821 A1 | 10/2015 | Rack-Gomer et al. |
| 2016/0142493 A1 | 5/2016 | Moriguchi et al. |
| 2018/0082038 A1* | 3/2018 | Blair, II ............... G06Q 10/087 |

FOREIGN PATENT DOCUMENTS

| | | |
|---|---|---|
| JP | 2005-157837 A | 6/2005 |
| JP | 2005-321934 A | 11/2005 |
| JP | 2012-523038 A | 9/2012 |
| JP | 2015-28742 A | 2/2015 |
| JP | 5792891 B2 | 10/2015 |
| WO | 2010/120440 A2 | 10/2010 |
| WO | 2014/119255 A1 | 8/2014 |

\* cited by examiner

ON-DEMAND SERVICE PROVIDING SYSTEM AND ON-DEMAND SERVICE PROVIDING METHOD

CROSS REFERENCE TO RELATED APPLICATIONS

This application is a National Stage of International Application No. PCT/JP2017/041670, filed on Nov. 20, 2017, which claims priority from Japanese Patent Application No. 2016-232929, filed on Nov. 30, 2016, the entire contents of which are herein incorporated by reference in their entireties.

TECHNICAL FIELD

The present invention relates to an on-demand service providing system and an on-demand service providing method.

BACKGROUND ART

Various engineering systems are constructed in plants and factories, and advanced automatic operation has been implemented. Engineering systems constructed in plants or the like are such as a distributed control system (DCS), a manufacturing execution system (MES), a plant information management system (HMS), an enterprise resource planning system (ERP), and so on.

Conventionally, these engineering systems are mostly implemented by using devices installed in plants, such as a PLC (Programmable Logic Controller), an FA (Factory Automation) computer, a general-purpose desktop computer, a server device, and so on. In recent years, with a progress of communication technology, a part of these engineering systems is implemented by cloud computing via a network.

A cloud computing for industrial automation and production system is disclosed in Patent Literature 1. An example of a technology for providing, by cloud computing, a development environment for developing an application program used in a cloud computing environment is disclosed in Patent Literature 2.

CITATION LIST

Patent Literature

[Patent Literature 1]
Japanese Unexamined Patent Application Publication (Translation of PCT Application) No. 2012-523038
[Patent Literature 2]
Japanese Patent No. 5792891

SUMMARY OF INVENTION

Technical Problem

Meanwhile, various sensors for measuring various process values (for example, temperature, pressure, flow rate, and so on) are provided in the plants, and control is performed in accordance with measurement results of these sensors. It is not limited to such a plant, generally, at least a sensor, an A/D (analog/digital) converter, hardware such as a computer, and software used in the computer are required for measuring some kind of physical quantity (for example, temperature, pressure, and flow rate, and so on) and to obtain the measurement result.

The sensor is necessary for detecting a physical quantity which is a measurement target. The A/D converter is necessary for converting the detection result of the sensor into a digital signal. The computer is necessary for storing the digital signal converted by the A/D converter and for performing various processes such as a statistical process as necessary. The software used in the computer is such as a program for performing various processes (for example, a statistical process) of the obtained digital signal.

Therefore, in a case of measuring a measurement target, first, it is necessary to select a sensor suitable for the measurement target, to select an A/D converter corresponding to the selected sensor, and select a computer and software suitable for receiving the digital signal converted by the A/D converter and for various processes. Further, it is necessary to purchase the selected sensor, the selected A/D converter, the selected computer, and the selected software, to connect the sensor, the A/D converter, and the computer with reference to a manual attached to each of them, and to perform various settings of the sensor, the A/D converter, and the computer after installing the software.

As described above, conventionally, it is necessary to connect hardware, to perform various settings for hardware, and to perform various settings for software independently. It totally depends on a worker's skill whether necessary measurement results can be obtained or not. For this reason, conventionally, for example, if there is at least one setting mistake, a correct measurement result cannot be obtained, and it takes a long time to obtain a correct measurement result.

Mostly, an engineering company is requested to develop an engineering system constructed in a plant. The engineering company specializes in developing engineering systems, and has many engineers familiar with the hardware such as sensors and the software. For this reason, if the connection and the various settings are requested to the engineering company, a necessary measurement result can be obtained in a short time without performing extra work. However, since it is extremely expensive to request to the engineering company, there is a problem that it is difficult to request the work easily.

The present invention is made in consideration of the above-described problem, and an aspect of the present invention is to provide an on-demand service providing system and an on-demand service providing method which can provide a service for measuring a measurement target easily and inexpensively without performing complicated settings in response to a demand.

Solution to Problem

An on-demand service providing system which provides a service required for measuring a measurement target in response to a request from a user, the on-demand service providing system may include a selector configured to select a service which uses a sensor required for measuring at least the measurement target, and a system environment setter configured to set up a system environment for collecting a measurement result of the sensor used by the service selected by the selector as data which is usable for the user who has instructed to select the service via a network based on selection information obtained by the selector.

Further features and aspects of the present disclosure will become apparent from the following detailed description of exemplary embodiments with reference to the attached drawings.

Advantageous Effects of Invention

The present invention selects a service which uses a sensor required for measuring at least a measurement target, and sets up a system environment for collecting a measurement result of the sensor used by the selected service as data which is usable for a user who has instructed to select the service via a network. For this reason, since data representing the measurement result of the sensor is collected via the network when the user installs an ordered sensor without performing complicated settings, the present invention achieves an effect of measuring a measurement target easily and inexpensively.

DESCRIPTION OF EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an on-demand service providing system and an on-demand service providing method which can provide a service for measuring a measurement target easily and inexpensively without performing complicated settings in response to a demand.

Hereinafter, an on-demand service providing system and an on-demand service providing method of an embodiment of the present invention will be described in detail with reference to drawings. For example, the on-demand service providing system of the present embodiment is implemented by cloud computing. For example, the cloud computing may be in conformity with the definition (definition recommended by the US National Institute of Standards and Technology) described in the document specified by the following URL (Uniform Resource Locator).

http://nvlpubs.nist.gov/nistpubs/Legacy/SP/nistspecialpublication800-145.pdf https://www.ipa.go.jp/files/000025366.pdf <System Outline of On-Demand Service Providing System>

Figure 1:
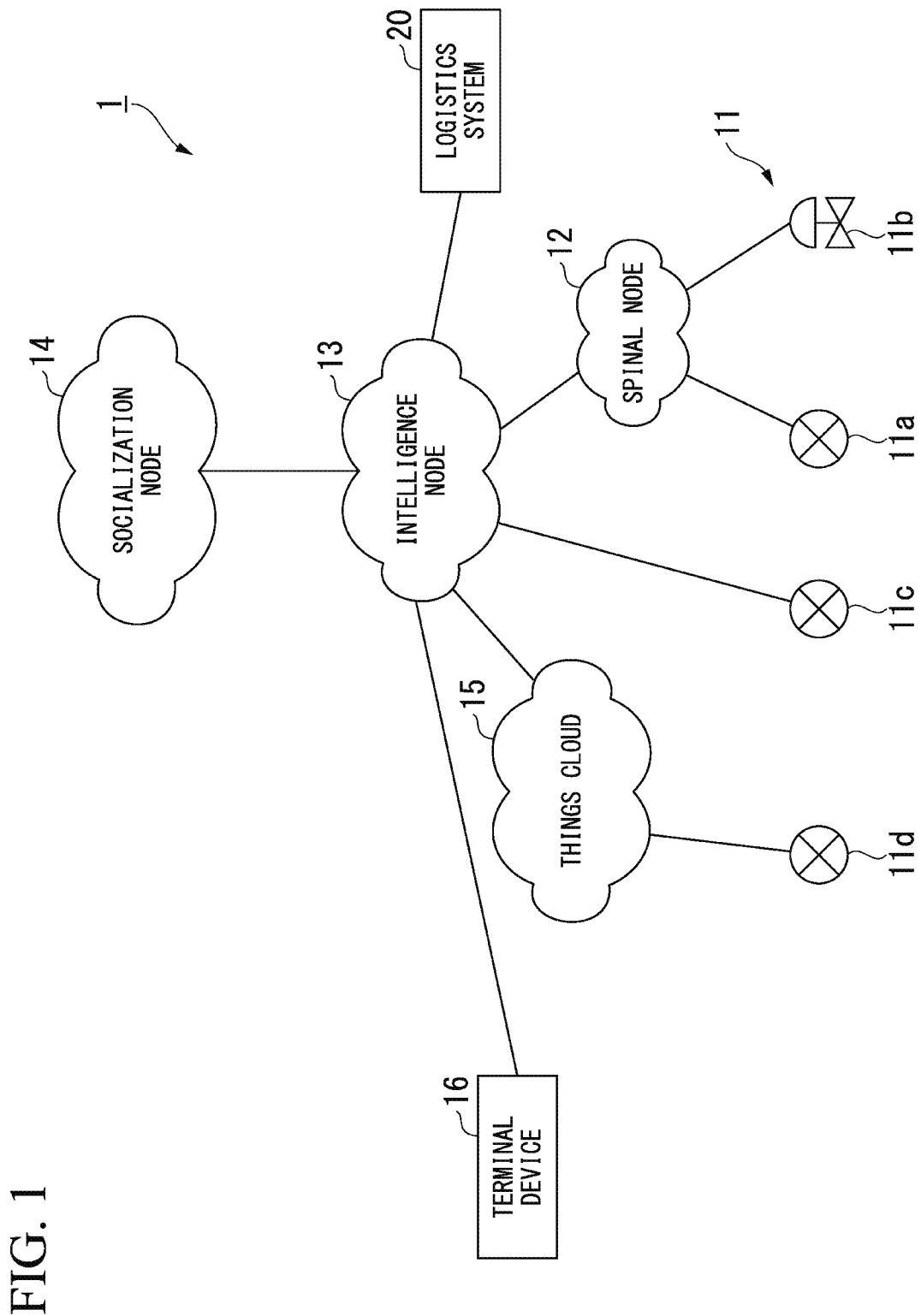
FIG. 1 is a schematic drawing illustrating a system outline of an on-demand service providing system of an embodiment of the present invention.

FIG. 1 is a schematic drawing illustrating a system outline of an on-demand service providing system of an embodiment of the present invention. As shown in FIG. 1, the on-demand service providing system 1 is a system basically configured by four hierarchies of a device node 11, a spinal node 12, an intelligence node 13, and a socialization node 14 in a cloud computing environment. As shown in the drawing, a things cloud 15, a terminal device 16, and a logistics system 20 are connected to the intelligence node 13 in the on-demand service providing system 1.

The device node includes various sensors, various devices, and various systems. The various sensors are, for example, a temperature/humidity sensor, a pressure sensor, a flow rate sensor, or the like. The various devices are, for example, a PLC (programmable logic controller) which is a control device, an OBD (On-Board Diagnostics) connected to a CAN-BUS (Controller Area Network-BUS) device in a vehicle, a KPI (Key Performance Indicator) monitor, a display for displaying a current value of a specific sensor, a lamp, a buzzer, a valve, a robot arm, or the like. Various systems are, for example, a DCS, a drone control system, an intrusion detection system, a security system to which an entry badge reader is connected, a building automation system to which a light, a door lock, an elevator, and a sprinkler are connected, or the like.

In the on-demand service providing system 1 shown in FIG. 1, the hierarchy of the device node 11 includes a device node 11a which is a sensor, a device node 11b which is an actuator, a device node 11c which is a sensor, and a device node 11d which is a sensor. Hereinafter, if it is unnecessary to distinguish the device nodes 11a to 11d, they are called generically as "device node 11".

In order to simplify the explanation, the device node 11 of the on-demand service providing system 1 in the present embodiment includes three device nodes 11a, 11c, and 11d which are sensors and one device node 11b which is an actuator, but the present invention is not limited thereto. The device nodes 11 may be arbitrarily configured by one or more device nodes, such as sensors, actuators, systems, and so on.

Sensors, devices, and systems of the device nodes 11 include a device which transmits data, a device which receives and displays data, a device which receives data and takes an action, and so on. For example, the sensors, the devices, and the systems are compatible with plug-and-play. Further, for example, the sensors, the devices, and the systems have a function for communicating simultaneously with a plurality of applications.

For example, the device nodes 11 include a device which communicates with a device included in the spinal node 12, a device which communicates with a device included in the intelligence node 13, and a device which communicates with a device included in the things cloud 15. For example, a device node 11 communicatively connected to a device included in the spinal node 12 is a device which requires a real-time property, a device used by an application which is not permitted to delay (delay of data communication) and fluctuate (fluctuation of data communication speed), a device which may tighten a communication bandwidth when it is connected directly to the intelligence node 13 to generate a large amount of data, or the like.

A device node 11 communicatively connected to a device included in the intelligence node 13 is different from a device node 11 which communicatively connected to a device included in the spinal node 12. For example, the device node 11 communicatively connected to a device included in the intelligence node 13 is a device used by an application which is not affected by delay and fluctuation. For example, a device node 11 connected to a device included in the things cloud 15 is a device which is installed in a remote place and required for communicating via a wireless communication network such as a mobile phone network or a satellite line, a device to be moved, or the like.

In the example shown in FIG. 1, for example, the device node 11a and the device node 11b are connected to a device included in the spinal node 12 via a local area network (LAN). For example, the device node 11c is connected to a device included in the intelligence node 13 via the Internet. For example, the device node 11d is connected to a device included in the things cloud 15 via a cellular network.

The spinal node 12 includes a server device, and functions as a gateway. The server device included in the spinal node 12 (hereinafter, simply called as "spinal node 12") is a server device which accommodates (in other words, logically connects, manages, or inputs/outputs data) at least one device node 11 in the cloud computing environment.

Generally, the spinal node 12 is a device called as a gateway server, a fog computer, an edge computer, or the like, for example. The spinal node 12 is installed between a server device (the intelligence node 13 and the socialization node 14 in the present embodiment) in the cloud computing environment and sensors, devices, and systems included in the device nodes 11.

For example, the spinal node 12 performs a conversion process of a communication protocol to data transmitted and received between the device node 11 and the intelligence node 13. For example, the spinal node 12 receives data transmitted from the device nodes 11, performs processes such as calculation, interpretation, and determination to the received data, and transmits the processed result to the intelligence node 13. The spinal node 12 transmits a control signal generated by the above-described processes to an appropriate device node 11.

In a case where the spinal node 12 is constituted by a single hardware, in preparation for a failure or abnormal operation in the spinal node 12, the device node 11 communicatively connected to the spinal node 12 may transmit data to two or more spinal nodes 12 in parallel. If the device node 11 is a device which communicates in accordance with the Internet protocol, the device node 11 may transmit data and control signals to the communication network using a technology such as multicasting or broadcasting, and two or more spinal nodes 12 may receive the data and the control signal in parallel in order to perform redundancy.

The intelligence node 13, the socialization node 14, and the things cloud 15 include a server device and a network device which provide a cloud computing environment. Here, the cloud computing environment is an environment for providing various services by a server connected to a network such as the Internet. The intelligence node 13, the socialization node 14, and the things cloud 15 may be physically separated by separate devices, or may be logically separated in a single device.

A device included in the intelligence node 13 (hereinafter, simply called as "intelligence node 13") constructs an environment required for measuring a measurement target (temperature, pressure, flow rate, or the like) in response to a request from a user (hereinafter, called as "tenant") of the on-demand service providing system 1. Here, the user is a person who uses a service provided by the on-demand service providing system 1, and the user includes an individual as a natural person, a company as a corporate person, and so on. In a case where the user is a company, the tenant may be an organization (hereinafter, called as "site") such as a department or group in a company or an employee (hereinafter, called as "account").

Specifically, the intelligence node 13 has a function of selecting (in other words, "ordering") a service which uses a sensor required for measuring the measurement target. Based on the obtained selection information (hereinafter, called as "order acceptance information"), the intelligence node 13 constructs a system environment for collecting measurement results of the sensor used in the ordered service via the network, as data which is usable for the tenant who has instructed to select (hereinafter, described as "ordered") the sensor. The system environment is constructed so that the tenant can measure the measurement target extremely easily without complicated setting or the like.

The intelligence node 13 manages the spinal node 12 and the device node 11 which are communicatively connected to the intelligence node 13. The intelligence node 13 can be accessed through a human machine interface (HMI). Therefore, the tenant can use various services provided by the on-demand service providing system 1 by accessing the intelligence node 13 through the human machine interface. For example, the human machine interface may be the terminal device 16 shown in FIG. 1.

As shown in FIG. 1, the intelligence node 13 collaborates with the logistics system 20 connected via the network, transmits various kinds of information to the logistics system 20, and receives various kinds of information from the logistics system 20. For example, the intelligence node 13 periodically receives and transmits information representing a stock status of the logistics system 20 to and from the logistics system 20, and the intelligence node 13 grasps a storage condition of various parts, various appliances, and various devices stored in the logistics system 20. The logistics system 20 includes a computer terminal connected to the intelligence node 13 via the network. The computer terminal may include a storage means for periodically transmitting and receiving information representing the stock status and for storing a software application for grasping a storage condition of storage parts, various appliances, and various devices, and a calculation control means for executing the software application.

In a case that the intelligence node 13 has accepted an order for a sensor from a tenant, the intelligence node 13 transmits a delivery request of the sensor to the logistics system 20 (or a computer terminal of the logistics system 20) based on the order acceptance information. The intelligence node 13 transmits, to the logistics system 20, initial setting information required for operating the sensor delivered in accordance with the delivery request. Specifically, the intelligence node 13 transmits, to the logistics system 20, information representing a transmission destination of the measurement result, information representing a transmission period of the measurement result, information representing the measurement result to be transmitted, and so on.

In addition, the intelligence node 13 has various external interfaces for collaborating with various external systems. For example, the intelligence node 13 collaborates with an external IoT (Internet of Things), an external IIoT (Industrial Internet of Things) cloud computing environment, an external charging system, an external database system, and so on. For example, the intelligence node 13 collaborates with the external charging system, and charges the tenant in accordance with a collection status of the measurement result of the sensor.

A device included in the socialization node 14 (hereinafter, simply called as "socialization node 14") provides, for example, a function for implementing various communications between tenants which use the on-demand service providing system 1. For example, it provides a chat function, a video communication function, a voice communication function, a screen sharing function, and community functions such as a message board and a social network service (SNS), which are used by tenants.

The things cloud 15 provides a platform service for connecting the device node to the cloud (specifically, the intelligence node 13). The platform service for connecting the device node to the cloud (intelligence node 13) may be provided by one or more devices included in the things cloud 15.

The terminal device 16 is communicatively connected to the intelligence node 13. For example, the terminal device 16 is operated by a tenant using a service provided by the on-demand service providing system 1 when using the service. For example, the terminal device 16 is implemented by a personal computer having a device body including an input device such as a keyboard, a display device such as a liquid crystal display device, a CPU (Central Processing Unit), a RAM (Random Access Memory), and so on. For example, the type of the personal computer may be a desktop type, a notebook type, a tablet type, or the like.

The logistics system 20 is a system which stores various parts, various appliances, various devices, including the sensor, and performs a delivery management and a delivery instruction. As shown in FIG. 1, this logistics system 20 is connected to the intelligence node 13, and the logistics system 20 transmits/receives various kinds of information to/from the intelligence node 13. For example, the logistics system 20 periodically provides information representing the stock status of the logistics system 20 to the intelligence node 13.

In a case that the delivery request of the sensor has been transmitted from the intelligence node 13, the logistics system 20 performs a delivery instruction of the sensor (or an instruction of arrangement for delivering the sensor) based on the delivery request. In a case that the initial setting information for performing an initial setting of the sensor has been transmitted from the intelligence node 13 in accordance with the delivery request of the sensor, the logistics system 20 performs the initial setting of the sensor based on the initial setting information. The initial setting information includes information representing a transmission destination of the measurement result, information representing a transmission period of the measurement result, information representing a measurement result to be transmitted, a passcode for authentication, and so on.

<Functional Configuration of On-Demand Service Providing System>

Figure 2:
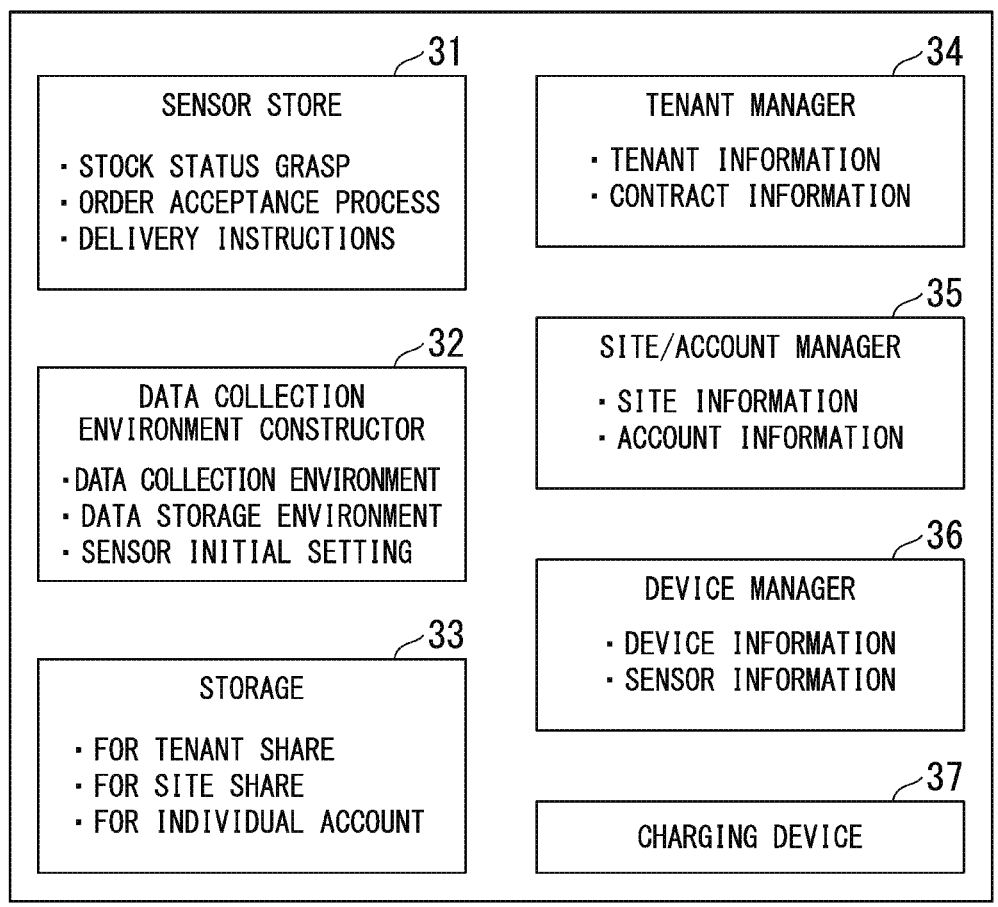
FIG. 2 is a functional block diagram implemented by the on-demand service providing system in the embodiment of the present invention.

FIG. 2 is a functional block diagram implemented by the on-demand service providing system in the embodiment of the present invention. Each function shown in FIG. 2 may be implemented by only one of the intelligence node 13 and the socialization node 14, or may be realized by both the intelligence node 13 and the socialization node 14. In the present embodiment, in order to describe simply, it is assumed that each function shown in FIG. 2 is implemented by the intelligence node 13.

As shown in FIG. 2, the on-demand service providing system 1 includes a sensor store 31 (selector), a data collection environment constructor 32 (system environment setter), a storage 33, a tenant manager 34, a site/account manager 35, a device manager 36, and a charging device 37.

The sensor store 31 is a so-called internet shopping mall. The sensor store 31 performs a process of selling a sensor based on an order from a tenant. Specifically, the sensor store 31 periodically transmits/receives (may transmit/receive non-periodically) information representing a stock status of the logistics system 20 to/from the logistics system 20, and the logistics system 20 grasps a storage condition of various devices including a sensor, which has been stored in the logistics system 20. Then, in accordance with the grasped storage condition of various devices, the sensor store 31 selects whether or not to provide various devices as service targets, and shows arrival schedule for various devices which are not in stock.

Figure 3A:
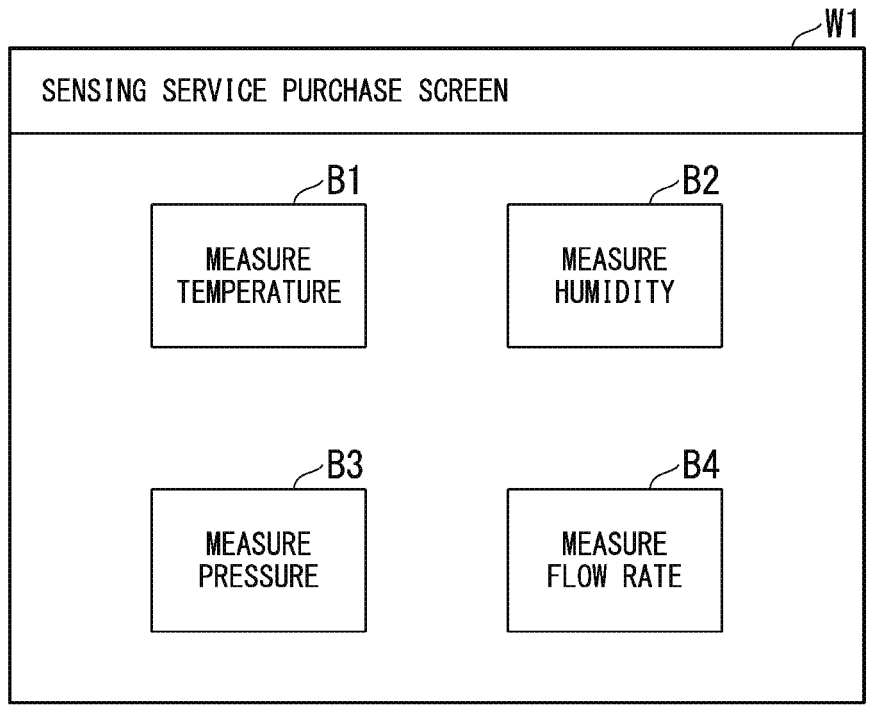
FIG. 3A is a drawing illustrating an example of an initial screen of the sensing service purchase screen in the embodiment of the present invention.
Figure 3B:
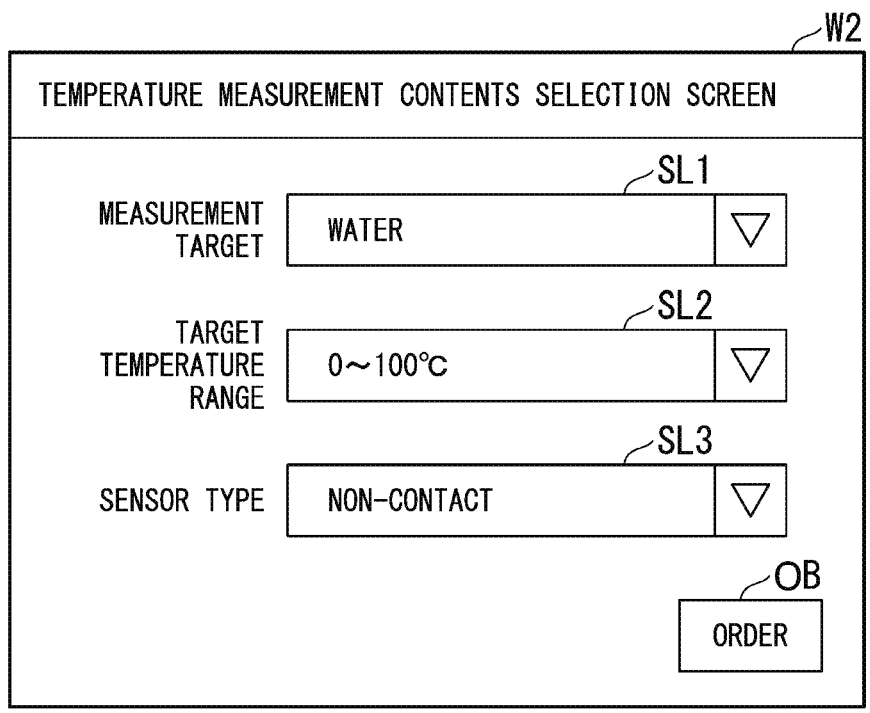
FIG. 3B is a drawing illustrating an example of a temperature measurement contents selection screen in the embodiment of the present invention.

The sensor store 31 receives an order from a tenant. For example, the sensor store 31 causes the terminal device 16 to display a sensing service purchase screen shown in FIG. 3A and FIG. 3B, and receives an order for a sensing service specified on the sensing service purchase screen. FIG. 3A and FIG. 3B are drawings illustrating an example of a sensing service purchase screen in the embodiment of the present invention. FIG. 3A is a drawing illustrating an example of an initial screen W1 of the sensing service purchase screen. FIG. 3B is a drawing illustrating an example of a temperature measurement contents selection screen W2.

As shown in FIG. 3A, on the initial screen W1 of the sensing service purchase screen, selection buttons B1 to B4 of measurement targets are provided. These selection buttons B1 to B4 are buttons for selecting so-called "what to measure". In the example shown in FIG. 3A, the selection button B1 is a button for selecting "measure temperature", and the selection button B2 is a button for selecting "measure humidity". The selection button B3 is a button for selecting "measure pressure", and the selection button B4 is a button for selecting "measure flow rate". The initial screen W1 of the sensing service purchase screen shown in FIG. 3A is merely an example. In addition to the selection buttons B1 to B4, other selection buttons may be provided on the initial screen W1 of the sensing service purchase screen, and the selection buttons B1 to B4 can be arbitrarily arranged.

The temperature measurement contents selection screen W2 shown in FIG. 3B is a screen displayed when the selection button B1 is selected in FIG. 3A. On the temperature measurement contents selection screen W2, a selection field SL1 for selecting a measurement target, a selection field SL2 for selecting a target temperature range, a selection field SL3 for selecting a sensor type (model number), and an order button OB. In the example shown in FIG. 3B, "water" is selected in the selection field SL1, "0 to 100° C." is selected in the selection field SL2, and "non-contact" is selected in the selection field SL3.

At the right end of each of the selection fields SL1 to SL3, an option display button (a button on which a symbol of "∨" is displayed) is provided. This option display button is a button for displaying options of each of the selection fields SL1 to SL3. For example, when the option display button provided in the selection field SL1 is pressed, "water", "air temperature", and "body temperature" are displayed as options of the selection field SL1. For example, when the option display button provided in the selection field SL2 is pressed, "0 to 100° C.", "0 to 200° C.", "−30 to 50° C.", and "35 to 43° C." are displayed as options of the selection field SL2. For example, when the option display button provided in the selection field SL3 is pressed, "non-contact", "contact (probe)", and "contact (in-line)" are displayed as options of the selection field SL3. The temperature measurement contents selection screen W2 shown in FIG. 3B is merely an example, and the number and type of the selection fields are arbitrary.

It is also possible to change the options in each of the selection fields SL1 to SL3 in accordance with the contents selected in each of the selection fields SL1 to SL3. For example, when "water" is selected as an option of the selection field SL1, "0 to 100° C." and "0 to 200° C." may be displayed as options of the selection field SL2. Also, when "air temperature" is selected as an option of the selection field SL1, "−30 to 50° C.", "−10 to 40° C.", and "−50 to 30° C." may be displayed as options of the selection field SL2. When "water" is selected as an option of the selection field SL1, the temperature range of "0 to 200° C." displayed in the selection field SL2 is an option for measuring high pressure water. When "air temperature" is selected as an option of the selection field SL1, "−30 to 50° C.", "−10 to 40° C.", and "−50 to 30° C." displayed in the selection field SL2 are options set in accordance with the weather.

A humidity measurement contents selection screen (not shown) to be displayed when the selection button B2 in FIG. 3A is pressed, a pressure measurement contents selection screen (not shown) to be displayed when the selection button B3 in FIG. 3A is pressed, and a flow rate measurement contents selection screen (not shown) to be displayed when the selection button B4 in FIG. 3A is pressed are similar to the temperature measurement contents selection screen W2 shown in FIG. 3B. Therefore, these measurement contents selection screens are screens having selection fields for selecting a measurement target, a measurement range, and a sensor type, and an order button.

When the order button OB is pressed, the sensor store 31 generates an estimate based on contents selected in the selection fields on the purchase screen. For example, in a case that the selection button B1 is selected in the initial screen W1 of the sensing service purchase screen shown in FIG. 3A and the temperature measurement contents selection screen W2 shown in FIG. 3B is displayed, an estimate of contents selected in the selection fields SL1 to SL3 is generated when the order button OB is pressed. Therefore, in the example shown in FIG. 3B, the sensor store 31 generates an estimate of a temperature sensor whose measurement target is "water", whose target temperature range is "0 to 100° C.", and whose model number is "non-contact". The order (order acceptance) does not become final by only pressing the order button OB. The order (order acceptance) becomes final when a payment method of expenses and a shipping destination of the sensor have been input and a final order confirmation button (not shown) has been pressed after the order button OB has been pressed.

The sensor store 31 transmits a delivery request of the sensor to the logistics system 20 based on the order acceptance information obtained in the order acceptance process. For example, the sensor store 31 transmits, to the logistics system 20, delivery information including a type, a quantity, a delivery destination (for example, name and address of a tenant who has ordered), and a shipping date and time of the ordered sensor.

The data collection environment constructor 32 constructs (in other words, sets up) a system environment of a system configured by at least one of the intelligence node 13, which collects measurement results of the ordered sensor as data which can be used by the tenant who has ordered the sensor via the network, and socialization node 14 based on the order acceptance information obtained by the sensor store 31. For example, the data collection environment constructor 32 associates individual identification information (first information) for specifying the sensor and a tenant ID (second information) assigned to the tenant who has ordered the sensor. Further, the data collection environment constructor 32 sets up a system environment for collecting data transmitted via the network from the sensor specified by using the individual identification information as data which can be used by a tenant specified by using the tenant ID, and the data collection environment constructor 32 sets up a system environment for storing the collected data. The data collection environment constructor 32 may associate a passcode for authentication and the tenant ID in addition to the individual identification information.

The data collection environment constructor 32 sets up a system environment for the tenant to use the stored data. Specifically, the data collection environment constructor 32 sets up a system environment enabling the tenant to read, edit, and download the stored data. For example, in order to make it possible to read the stored data (measurement result of the sensor), the data collection environment constructor 32 constructs an environment for displaying a graph of statistical information, such as a change with time and an average value of the stored data. For example, the data collection environment constructor 32 sets up a kind of a graph which is to be displayed, using a template prepared for each kind of sensors in advance.

When the delivery request is transmitted from the sensor store 31, the data collection environment constructor 32 transmits initial setting information required for operating the delivered sensor to the logistics system 20. Specifically, the data collection environment constructor 32 transmits, to the logistics system 20, information representing a transmission destination of the measurement result, information representing a transmission period of the measurement result, information representing the measurement result to be transmitted, a passcode for authentication, and so on. Some sensors do not need the initial setting. Therefore, the initial setting information is transmitted if a delivery request of a sensor requiring the initial setting has been transmitted from the sensor store 31.

The storage 33 distinguishes various kinds of information (for example, data indicating a measurement result of a sensor) into information for public disclosure, information for tenant share, information for site share, and information for personal account. The storage 33 stores them respectively in a storage area for public disclosure, a storage area for tenant share, a storage area for site share, and a storage area for personal account. A storage area in which a user can store various kinds of information may be controlled based on the authority set in advance for each user by an administrator of a tenant. The storage 33 may be a storage medium such as a hard disk drive (HDD), a flash memory, an EEPROM (Electrically Erasable Programmable Read-Only Memory), a RAM (readable and writable memory), a ROM (Read Only Memory), or an arbitrary combination of these storage mediums. The data collected by the system environment constructed by the data collection environment constructor 32 is stored in the storage 33.

The tenant manager 34 manages various kinds of information on tenants. For example, the tenant manager 34 sets, changes, and deletes information such as tenant basic information, charge information, operation authority, approval authority, and so on. For example, the tenant manager 34 manages, for each tenant, contract information on contracts of usage of the on-demand service providing system 1 and usage of pay or free applications, tools, templates, data, and so on.

The site/account manager 35 manages various kinds of information on site and account. For example, the site/account manager 35 sets, changes, and deletes information such as basic information on site and account, charging information, operation authority, approval authority, and so on.

The device manager 36 manages information on sensors, devices, and systems included in the device node 11 accommodated by the intelligence node 13. The device manager 36 of the intelligence node 13 may obtain, via the spinal node 12, information on sensors, devices, and systems included in the device node 11 accommodated by the spinal node 12, and may manage the information. Alternatively, the spiral node 12 may manage the information, and the device manager 36 of the intelligence node 13 may obtain the information from the spinal node 12. This also applies to information on sensors, devices, and systems included in the device node 11 accommodated by the things cloud 15.

The charging device 37 performs a charging process for a tenant using the on-demand service providing system 1. For example, the charging device 37 charges the tenant in accordance with a collection status (collection status with respect to the on-demand service providing system 1) of measurement results obtained from the sensor ordered by the tenant. The charge destination may be registered in advance for each tenant, site, or account.

<Operation of On-Demand Service Providing System>

Figure 4:
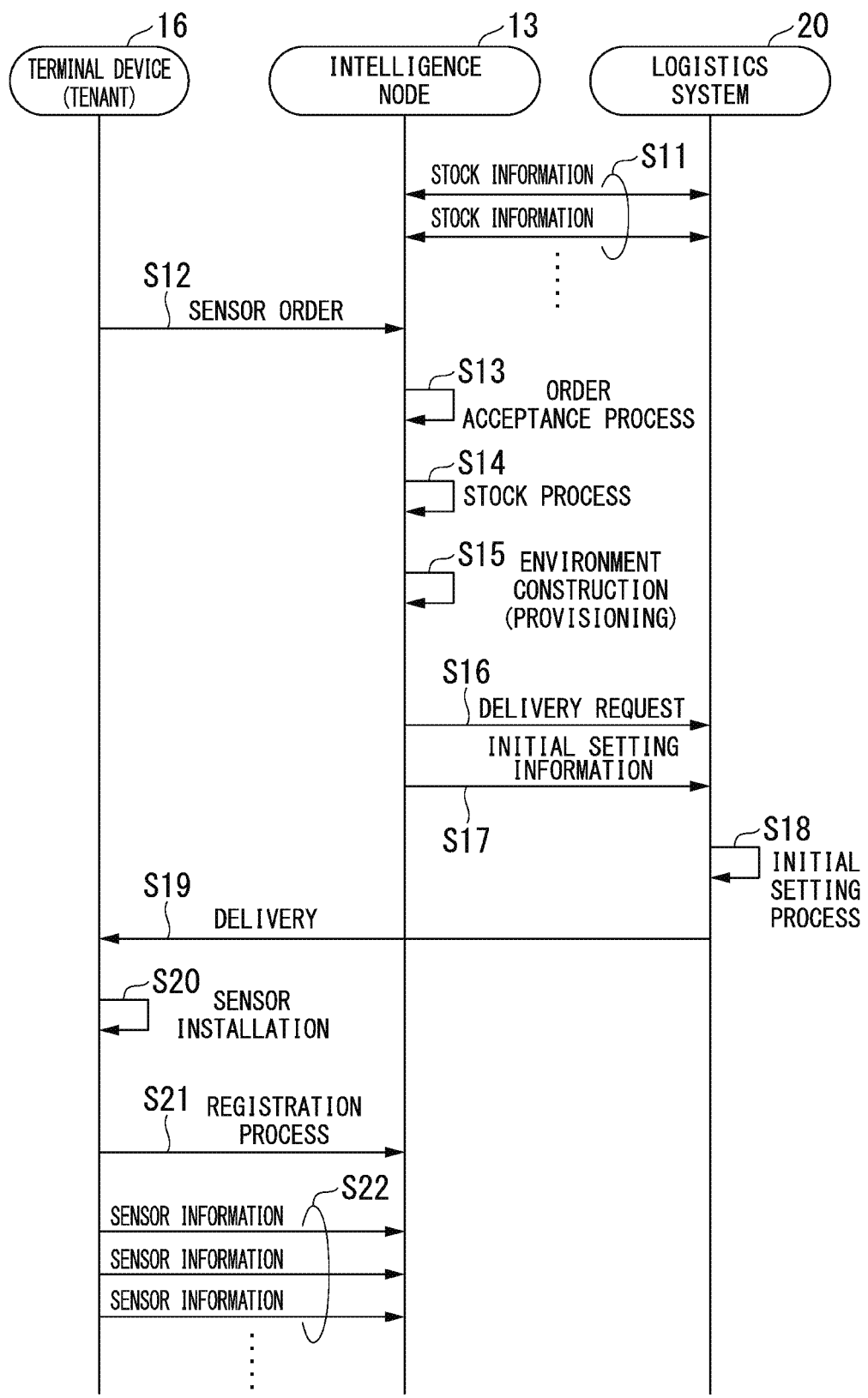
FIG. 4 is a flowchart illustrating an example of operation of the on-demand service providing system in the embodiment of the present invention.

FIG. 4 is a flowchart illustrating an example of operation of the on-demand service providing system 1 in an embodiment of the present invention. As shown in FIG. 4, since information representing the stock status of the logistics system 20 is periodically (or non-periodically) transmitted between the intelligence node 13 and the logistics system 20, the intelligence node 13 periodically grasps the storage conditions of various parts, various appliances, and various devices stored in the logistics system 20 (step S11).

It is now assumed that the terminal device 16 is operated by the tenant to instruct to purchase the sensor (step S12). The tenant who instructs to purchase the sensor may be a person who has already used the on-demand service providing system 1 or a person who will use the on-demand service providing system 1 after this. When the tenant instructs to purchase, the sensor store 31 of the on-demand service providing system 1 starts an order acceptance process (step S13).

When the order acceptance process is started, the sensor store 31 causes the terminal device 16 to display a sensing service purchase screen. As a result, for example, the initial screen W1 of the sensing service purchase screen shown in FIG. 3A is displayed on the terminal device 16. It is assumed that the tenant who operates the terminal device 16 desires to measure temperature, and the tenant who operates the terminal device 16 presses the selection button B1 displayed on the initial screen W1 of the sensing service purchase screen shown in FIG. 3A. Then, the sensor store 31 displays the temperature measurement contents selection screen on the terminal device 16. As a result, for example, the temperature measurement contents selection screen W2 shown in FIG. 3B is displayed on the terminal device 16.

It is assumed that the tenant who operates the terminal device 16 selects a measurement target in the selection field SL1 arranged in the temperature measurement contents selection screen W2, selects a target temperature range in the selection field SL2, selects a sensor type (model number) in the selection field SL3, and thereafter presses the order button OB. Then, the sensor store 31 performs an estimation process, and a payment setting item of expenses are displayed on the terminal device 16 together with the result of the estimation process. Here, as the payment setting item of expenses, for example, monthly payment, annual payment, card payment, bill payment, or the like can be selected.

When the estimation result displayed on the terminal device 16 is checked by the tenant and an operation of "proceed" is made by the tenant, the sensor store 31 causes the terminal device 16 to display an input screen (not shown) for inputting a shipping address and name of the ordered sensor, a billing address and name of the ordered sensor, and a payment method. As the information on the shipping destination and the billing destination, information previously associated with tenant information (for example, tenant ID) by another process and held may be used. When necessary items are input and an order confirmation button (not shown) is pressed on this input screen by the tenant, the order (order acceptance) becomes final. After the above-described processes, the order acceptance process of the sensor store 31 is completed.

When the order acceptance process has been completed, the data collection environment constructor 32 of the on-demand service providing system 1 performs a stock allocation process (step S14). Specifically, the data collection environment constructor 32 subtracts a stock quantity of the sensor of which order has been accepted in the process of step S13 by a number of sensors of which order has been accepted in the process of step S13. The data collection environment constructor 32 associates the individual identification information for identifying the ordered sensor with the tenant ID assigned to the tenant who has ordered the sensor in step S12. In addition to the individual identification information, the data collection environment constructor 32 may associate the passcode for authentication with the tenant ID.

When the stock allocation process has been completed, the data collection environment constructor 32 performs a process (provisioning) of constructing (in other words, setting up) a system environment of the system implemented by at least one of the intelligence node 13 and the socialization node 14 which collect data representing a measurement result of the sensor (step S15). This process is a process of constructing a system environment for collecting data transmitted via the network from the sensor having the individual identification information associated with the tenant ID in the stock allocation process as data which can be used by the tenant identified by the tenant ID, and for storing the data.

Figure 5:
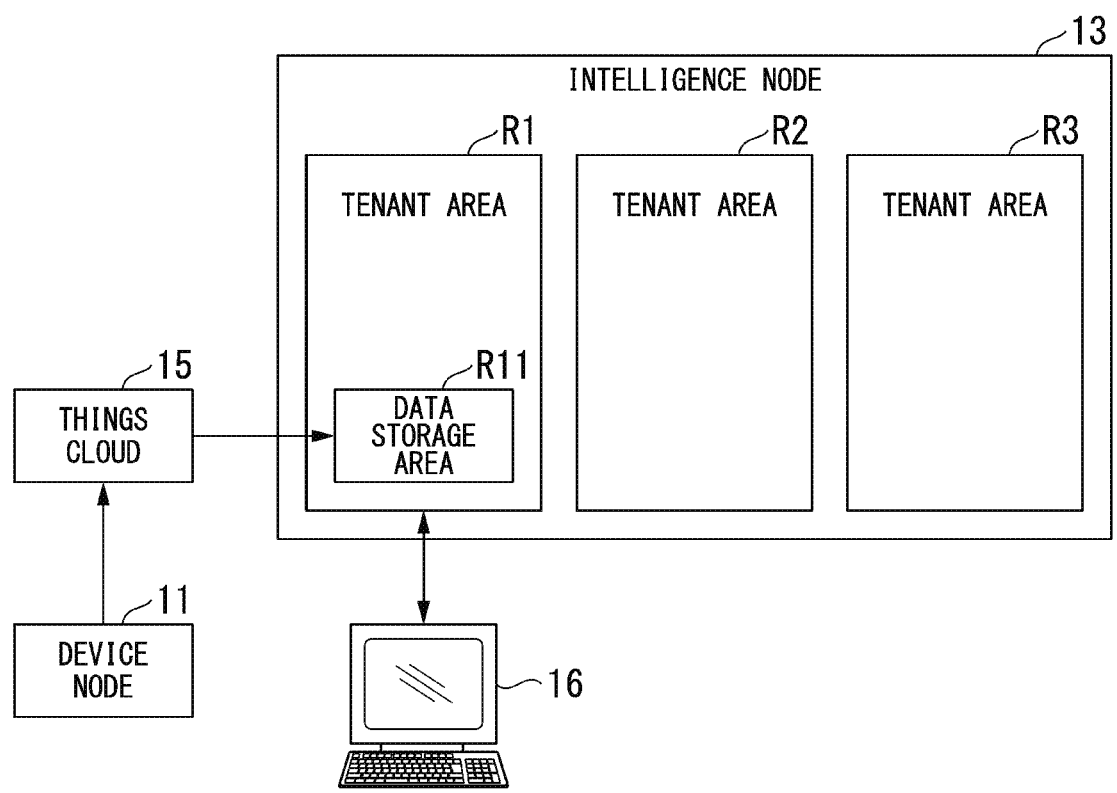
FIG. 5 is a drawing for explaining a data collection environment constructed in the embodiment of the present invention.

FIG. 5 is a drawing for explaining a data collection environment constructed in an embodiment of the present invention. As shown in FIG. 5, tenant areas R1 to R3 for each tenant are provided in the intelligence node 13. The tenant areas R1 to R3 are generated using the information managed by the tenant manager 34 shown in FIG. 2. Here, in order to explain simply, only three tenant areas R1 to R3 are shown. However, the tenant areas are provided in accordance with a number of tenants who use the on-demand service providing system 1. Here, it is assumed that the tenant area R1 in FIG. 5 is a tenant area for a tenant who has ordered a sensor by using the terminal device 16.

The tenant area is an area in which components included in a cloud computing environments such as computers, servers, routers, switches, and so on are shared by a plurality of tenants in a system environment to which cloud computing technology is applied (in other words, a system environment applied to multi-tenant). Computer resources divided logically by applying virtualization technology or the like may be allocated to each tenant. Different networks may be constructed for each tenant using VLAN (Virtual Local Area Network) or the like, and a plurality of logically divided systems (plural tenants) may be constructed in the system environment.

In the provisioning described above, as shown in FIG. 5, the data collection environment constructor 32 generates a data storage area R11 for storing the data collected from the sensor in the tenant area R1 of the tenant who has ordered the sensor. The data storage area R11 is generated logically in the tenant area R1, but is physically generated in the storage 33 shown in FIG. 2.

In the provisioning described above, the data collection environment constructor 32 performs a setting process of storing the data transmitted via the network from the sensor (a sensor having the individual identification information associated with the tenant ID of the tenant who has ordered the sensor) into the data storage area R11 (the data storage area R11 provided in the tenant area R1 of the tenant who has ordered the sensor). If the tenant area R1 of the tenant who has ordered the sensor does not exist, the data collection environment constructor 32 generates the tenant area R1 and executes the above process (a process of generating the data storage area R11 and a setting process for storing the data in the data storage area R11).

In addition, in the provisioning described above, in order to make it possible to refer to the data stored in the data storage area R11, the data collection environment constructor 32 constructs a system environment which can display a graph of statistical information such as a change with time of the stored data and an average value of the stored data. For example, the data collection environment constructor 32 sets a display format of the graph using templates prepared in advance for each type of sensors.

When the above process has been completed, the sensor store 31 transmits a delivery request of the sensor to the logistics system 20 based on the order acceptance information obtained in the order acceptance process in step S13 (step S16). Specifically, for example, delivery information, which includes a type, a quantity, a delivery destination (for example, a name and an address of the tenant who has ordered), a shipping date and time of the ordered sensor, is transmitted from the sensor store 31 to the logistics system 20.

When the delivery request of the sensor has been transmitted by the sensor store 31, the data collection environment constructor 32 transmits initial setting information required for operating the delivered sensor to the logistics system 20 (step S17). When the initial setting information has been transmitted, the logistics system 20 performs an initial setting process for the sensor requested by the delivery request by using the initial setting information (step S18). For example, the logistics system 20 performs a process of setting, to the delivered sensor, information representing a transmission destination of a measurement result, information representing a transmission period of a measurement result, information representing a measurement result to be transmitted, a passcode for authentication, and so on.

In the present embodiment, in order to understand easily, after the data collection environment constructor 32 of the intelligence node 13 has completed the provisioning (step S15), the delivery request (step S16) and the initial setting information (step S17) are transmitted. However, the process of step S15 and the processes of steps S16 and S17 may be performed in parallel, or the process of step S15 may be performed after the processes of steps S16 and S17. In a case where the sensor on which the delivery request has been transmitted in step S16 does not require an initial setting, the processes of steps S17 and S18 are omitted.

When the above process has been completed, the sensor ordered by the tenant is delivered to the tenant from the logistics company which has the logistics system 20 based on the delivery instruction from the logistics system 20 (step S19). For example, the sensor may be delivered by courier. When the delivered sensor has arrived at the tenant, the tenant performs a work of installing the sensor at a place where temperature is desired to be measured (step S20).

When this work has been completed and the tenant has turned on the sensor, the sensor automatically performs a registration process for the intelligence node 13 (step S21). For example, in a case where the sensor installed by the tenant transmits data via a cellular network, as shown in HG 5, the sensor (device node 11) is connected to a device included in the things cloud 15, and connected to the intelligence node 13 via the singles cloud 15, and thereafter, the registration process is performed.

When the registration process has been performed, a storage destination of the data transmitted from the sensor (device node 11) is set to the data storage area R11 in the tenant area R1. Specifically, based on the individual identification information of the sensor and the tenant ID of the tenant associated in step S14, the data collection environment constructor 32 sets (associates) the storage destination of the data transmitted from the sensor (device node 11) to the data storage area R11 in the tenant area R1. When an authentication passcode has been registered for the sensor, the data collection environment constructor 32 authenticates the sensor using the passcode.

When the registration process has been completed, for example, data representing a measurement of temperature and a measurement result is transmitted at the transmission period set in the process of step S18. Here, as shown in FIG. 5, for example, the data transmitted from the sensor is transmitted to the intelligence node 13 via the things cloud 15, and the data is stored in the data storage area R11 of the tenant area R1. In this way, the data representing the measurement result of the sensor is collected (step S22).

Figure 6:
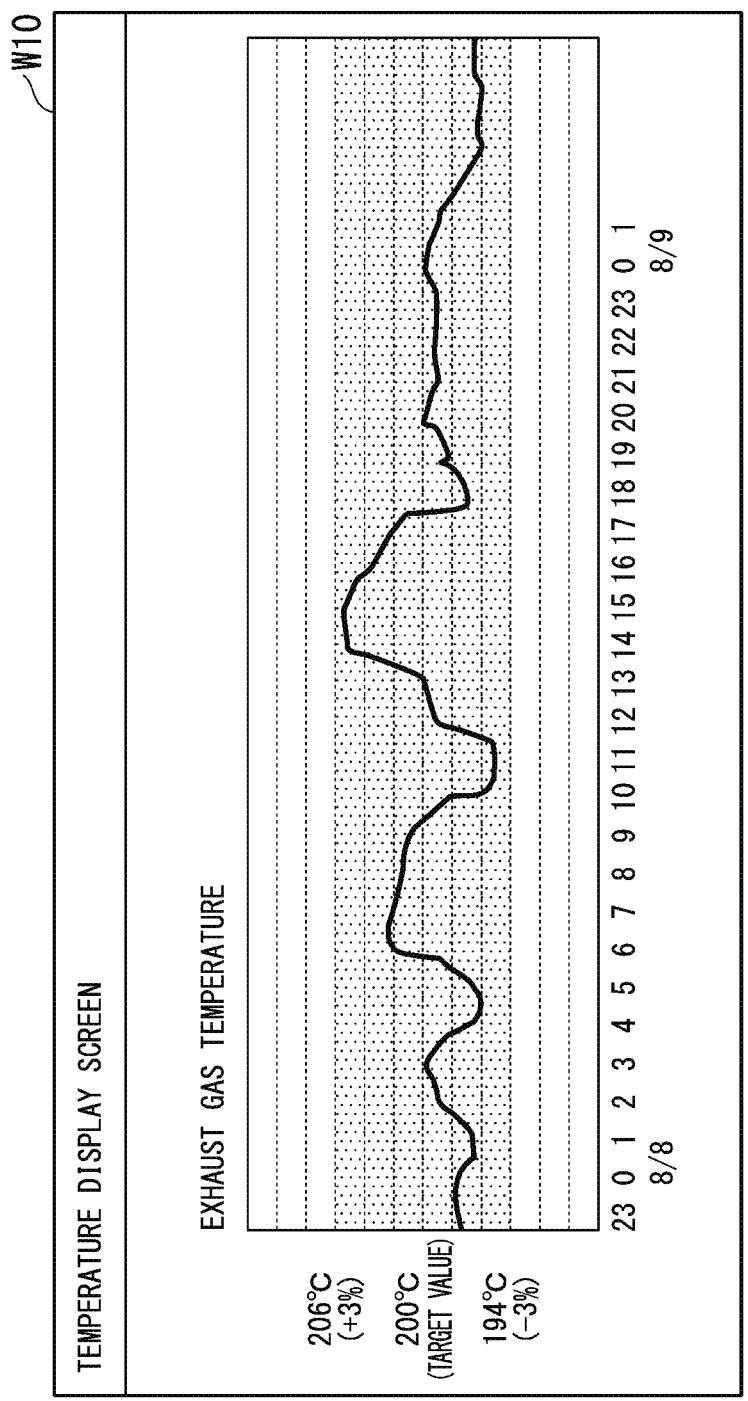
FIG. 6 is a drawing illustrating an example of a measurement result of a sensor displayed in the embodiment of the present invention.

If the process of step S22 is continued, an amount of data stored in the data storage area R11 of the tenant area R1 gradually increases. For example, when the tenant operates the terminal device 16 to login to the on-demand service providing system 1 and instructs to display the data stored in the data storage area R11, the data collection environment constructor 32 causes the terminal device 16 to display the data. FIG. 6 is a drawing illustrating an example of a measurement result of a sensor displayed in the embodiment of the present invention.

A graph showing a change with time of the measurement result of the sensor is displayed on a temperature display screen W10 shown in FIG. 6. In this graph, the horizontal axis represents time, and the vertical axis represents an exhaust gas temperature (measurement result of the sensor).

In the graph displayed on the temperature display screen W10, a temperature range ±3% of a target temperature (200° C.) is displayed (shaded, colored, or the like). Therefore, if the tenant referred to the graph displayed on the temperature display screen W10, the tenant can immediately grasp whether or not the exhaust gas temperature is within the predetermined temperature range. The temperature display screen W10 shown in FIG. 6 is merely an example, and another graph such as a graph showing a result of a statistic process of the measurement result may be displayed.

As described above, in the present embodiment, a system environment for accepting an order of a sensor ordered in accordance with an instruction of a tenant who uses the on-demand service providing system 1 and for collecting measurement results of the ordered sensor as data which is usable for the tenant who has ordered the sensor via the network, is constructed. For this reason, if the tenant just installs the ordered sensor without performing complicated settings, since data representing the measurement result of the sensor is collected via the network, a measurement target can be measured easily and inexpensively.

As described above, in the present embodiment, if the tenant has ordered a sensor, a system environment for collecting the measurement result from the sensor as data which can be used by a user who has ordered the sensor via the network is constructed automatically, and thereafter, the sensor is delivered (shipped). Therefore, in the present embodiment, it is possible to provide a service of "measure temperature" in a simple and straightforward manner in response to a request "want to measure temperature" from the tenant (on demand). For this reason, for example, if items are just selected by a method corresponding to a purpose, a service for realizing what the tenant wants to do can be provided to the tenant who know what the tenant wants to do "want to measure temperature", but does not know what kind of device should be used and how to use, for a required period in response to a request from the tenant (on demand).

Although an on-demand service providing system and an on-demand service providing method according to the embodiment of the present invention have been described above, the present invention is not limited to the above-described embodiments, and can be freely modified within the scope thereof. For example, in order to describe simply, although the foregoing descriptions of the embodiment have been examples in which a tenant orders only a sensor, but a plurality of modules may be mounted on the sensor, and a module to be mounted on the sensor may be selected when ordering. In the logistics system 20, based on information on the sensor and the module obtained when the order has been accepted, parts may be mounted to the sensor as a module, and the sensor may be shipped.

In addition to sensors, also as to other control devices and measuring instruments, various combinations of options may be selected in accordance with a purpose, and the selected combination may be shipped. For example, a combination of PLC modules, a combination of probes of measurement instruments, and a periodic ordering service of maintenance parts of physics and chemistry device may be proposed. The sensor may be disposable, or may be returned after an agreed usage period has been elapsed. For example, a return method of the latter sensor may be a courier service of cash on delivery.

For example, a part or whole of the on-demand service providing system 1 in the embodiment may be implemented by a computer. In a case where a part or whole of the on-demand service providing system 1 is implemented by a computer, a program for implementing a part or whole of functions of the on-demand service providing system 1 may be stored in a computer-readable storage medium, a computer system may read the program stored in the storage medium, and the program may be executed.

The "computer system" is a computer system in the on-demand service providing system 1, and may include hardware, such as an OS and a peripheral device. The "computer readable storage medium" is a storage device, such as a flexible disk, a magneto-optical disk, a ROM, and a CD-ROM, and a hard disk drive built in the computer system.

Further, the "computer readable storage medium" may include a medium which dynamically holds a program for a short period of time in a case that the program is transmitted via a network such as the Internet or a communication line such as a telephone line, and a memory which holds a program for a certain period of time, such as a volatile memory in the computer system as a server or a client in that case. Further, the program may be for implementing a part of the above-described functions, or may be for implementing the above-described functions together with a program already stored in the computer system.

A part or whole of the on-demand service providing system 1 in the embodiment may be implemented as an integrated circuit such as LSI (Large Scale Integration). Each of functional blocks of the on-demand service providing system 1 may be individually implemented as a processor, or a part or whole of them may be integrated into a processor. A method of forming an integrated circuit is not limited to LSI, and it may be implemented by a dedicated circuit or a general-purpose processor. If an integrated circuit technology to replace the LSI is obtained due to advances in semiconductor technology, an integrated circuit based on the technology may be used.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

REFERENCE SIGNS LIST

1 On-demand service providing system
20 Logistics system

31 Sensor store
32 Data collection environment constructor
37 Charging device

The invention claimed is:

1. An on-demand service providing system comprising:
a server device that collects a measurement result by a sensor which measures a measurement target via a network and provides a service for collecting the measurement result by the sensor in response to a request from a user; and
a logistics system configured to perform a delivery management of the sensor,
wherein the server device comprises:
a selector configured to cause a terminal device to display a sensing service purchase screen for specifying a sensing service, and cause the terminal device to display a measurement contents selection screen for further specifying the sensing service; and
a constructor configured to associate individual identification information for specifying the sensor and a tenant identifier (ID) of the user of the terminal device, and set up on the server device a system environment to collect data transmitted via the network from the sensor identified by the individual identification information, and the constructor being configured to store the collected data into a data storage area corresponding to the tenant ID,
wherein the selector is configured to transmit a delivery request of the sensor to the logistics system based on a selection on the measurement contents selection screen,
wherein the constructor is configured to transmit, to the logistics system, initial setting information including information representing a transmission destination of the measurement result of the sensor, information representing a transmission period of the measurement result, information representing the measurement result to be transmitted, and a passcode for authentication,
wherein the logistics system is configured to set, to the sensor requested by the delivery request, the information representing the transmission destination of the measurement result of the sensor, the information representing the transmission period of the measurement result, the information representing the measurement result to be transmitted, and the passcode for authentication by using the initial setting information transmitted by the constructor; and
wherein, when the sensor has been turned on, the constructor is configured to set a storage destination of the data transmitted from the sensor to the data storage area based on the individual identification information and the tenant ID associated with each other, and configured to authenticate the sensor using the passcode.

2. The on-demand service providing system according to claim 1,
wherein the selector is configured to periodically obtain from the logistics system, information representing a stock status of sensors stored in the logistics system.

3. The on-demand service providing system according to claim 1,
wherein the constructor is configured to set up the system environment for displaying a graph of statistical information of the collected data.

4. The on-demand service providing system according to claim 3,
wherein the constructor is configured to set a display format of the graph using templates for each type of sensor.

5. The on-demand service providing system according to claim 1, further comprising:
a storage which stores the collected data collected by the system environment.

6. The on-demand service providing system according to claim 1, further comprising:
a charging device configured to charge the user in accordance with a collection status of the data obtained from the sensor.

7. An on-demand service providing method performed by an on-demand service providing system comprising a server device and a logistics system, the server device collecting a measurement result by a sensor which measures a measurement target via a network and provides a service for collecting the measurement result by the sensor in response to a request from a user, the logistics system performing a delivery management of the sensor, the on-demand service providing method comprising:
causing, by a selector, a terminal device to display a sensing service purchase screen for specifying a sensing service, and causing the terminal device to display a measurement contents selection screen for further specifying the sensing service;
associating, by a constructor, individual identification information for specifying the sensor and a tenant identifier (ID) of the user of the terminal device, and setting up on the server device a system environment to collect data transmitted via the network from the sensor identified by the individual identification information, and storing, by the constructor, the collected data into a data storage area identified by the tenant ID;
transmitting, by the selector, a delivery request of the sensor to the logistics system based on a selection on the measurement contents selection screen;
transmitting, by the constructor, to the logistics system, initial setting information including information representing a transmission destination of the measurement result of the sensor, information representing a transmission period of the measurement result, information representing the measurement result to be transmitted, and a passcode for authentication;
setting, by the logistics system, to the sensor requested by the delivery request, the information representing the transmission destination of the measurement result of the sensor, the information representing the transmission period of the measurement result, the information representing the measurement result to be transmitted, and the passcode for authentication by using the initial setting information transmitted by the constructor; and
when the sensor has been turned on, setting, by the constructor, a storage destination of the data transmitted from the sensor to the data storage area based on the individual identification infomration and the tenant ID associated with each other, and authenticating the sensor using the passcode.

8. The on-demand service providing method according to claim 7, further comprising:
collecting data transmitted via the network from the sensor identified by the individual identification information and storing the collected data into the data storage area identified by the tenant ID.

9. The on-demand service providing method according to claim 7, further comprising:
periodically obtaining from the logistics system, by the selector, information representing a stock status of sensors stored in the logistics system.

10. The on-demand service providing method according to claim 7, further comprising:
  setting up, by the constructor, the system environment for displaying a graph of statistical information of the collected data.

11. The on-demand service providing method according to claim 10, further comprising:
  setting, by the constructor, a display format of the graph using templates for each type of sensor.

12. The on-demand service providing method according to claim 7, further comprising:
  charging the user, by a charging device, in accordance with a collection status of the data obtained from the sensor.

* * * * *